July 21, 1964
L. G. McMULLEN ETAL
3,141,508
STANDARD AND BEAM CONNECTING MEANS FOR
AN EARTH WORKING IMPLEMENT
Filed April 30, 1962
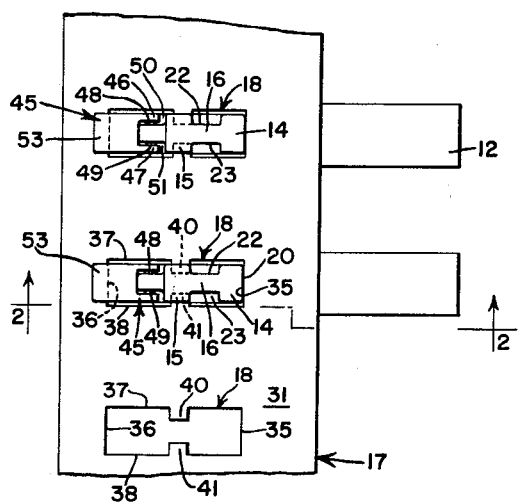
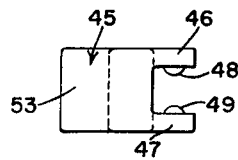
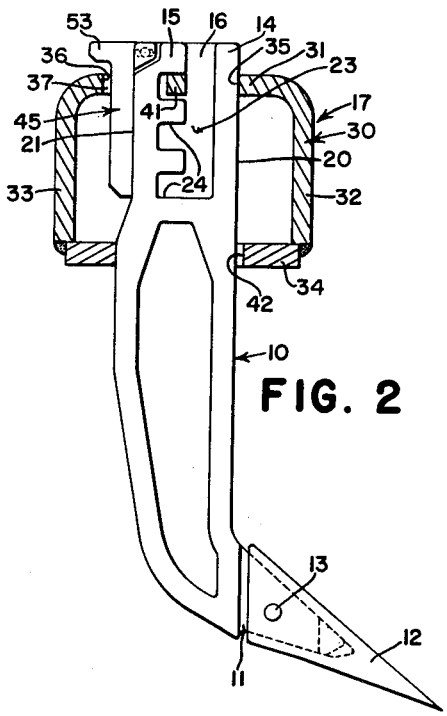
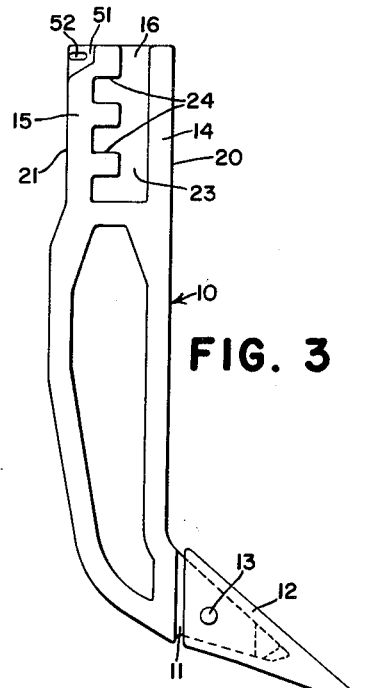
INVENTORS
L. G. McMULLEN
L. B. EBERHART
BY *William A. Murray*
ATTORNEY

United States Patent Office 3,141,508
Patented July 21, 1964

3,141,508
STANDARD AND BEAM CONNECTING MEANS FOR AN EARTH WORKING IMPLEMENT
Larry G. McMullen, Milan, and Lonnie B. Eberhart, Rock Island, Ill., assignors to Deere & Company, Moline, Ill., a corporation of Delaware
Filed Apr. 30, 1962, Ser. No. 190,970
8 Claims. (Cl. 172—744)

This invention relates to an earth ripping implement and more particularly to a means of mounting an earth cutting or digging tool on its main support that permits vertical positioning of the tool relative to the support.

The conventional type earth ripping tool is mounted on a transverse tool bar by extension through a vertical opening therein so as to permit vertical movement of the tool relative to the bar. Normally the shank of the tool has notches cut in either its front or rear edge to receive the respective edge of the opening of the bar. Since there are a plurality of notches, the shank of the tool may be raised and lowered relative to the bar and then moved so that the bar will enter into one of the notches and be held in the desired vertical position. A retainer pin is positioned against the opposite edge of the tool and between the edge of the tool and the edge of the opening so that the tool bar is retained in the desired notch. In this manner the shank or tool is fixed in the desired vertical position.

The main difficulty with this type of mounting arrangement is that notches cut into an edge of a tool shank creates an inherently weak point in the tool. This often results in failure of the tool shank or to compensate for such weakness an extremely heavy tool shank is provided which would not otherwise be necessary.

With the above in mind, it is the primary object of the present invention to provide a new and novel design of tool shank and tool bar which overcomes the above objection. It is proposed to have a central upright recessed recessed portion with notches cut in the sides of the shank. The tool bar has inwardly projecting lugs capable of being received in the recessed portion and upon the shank of the tool being moved fore and aft, being seated in the recessed notches of the tool. The entire front and rear edges of the tool shank are retained solid and the inherent weak point referred to in the previous paragraph does not exist. It has been found that the recessed portions do not weaken the overall tool.

It is also an object of the present invention to provide a new and novel retaining pin on the tool shank having no movable parts other than the retaining pin itself. Also it is proposed to provide a novel method of mounting the retaining pin on the shank of the tool.

Other objects and advantages of the invention will become apparent to those skilled in the art as the nature of the invention is better understood from the following description and as shown in the accompanying drawings.

FIG. 1 is a plan view of a portion of the supporting bar and the earth ripping tool attached thereto.

FIG. 2 is a sectional view taken substantially along the line 2—2 of FIG. 1.

FIG. 3 is a side view of the earth ripping tool.

FIG. 4 is an enlarged plan view of the retaining element used with the earth ripping tool.

The tool used is composed of an upper shank portion 10 and a lower tool carrying portion 11 projecting forwardly from the lower end of the shank. A tooth 12 is pinned, as at 13, to the projecting lower end 11. The shank 10 projects upwardly through a transverse tool bar 17 having a series of transversely spaced shank-receiving openings 18. As may be seen, the tool bar 17 will receive a plurality of tool shanks 10.

The shank 10 of the tool has an upper mounting end composed of front and rear wide portions 14, 15 interjoined by a comparatively narrow central portion 16 between the front and rear portions 14, 15. The front portion 14 projects rearwardly from the front upright edge 20 and the rear portion 15 extends forwardly from a rear edge 21. The central portion 16 is disposed inwardly as respects the wide front and rear portions 14, 15 and defines with those portions a pair of vertical guide slots or tracks 22, 23 opening upwardly and in opposite sides of the shank 10. The slots 22, 23 include rearwardly extending vertically spaced apart notches 24 projecting rearwardly into the rear portion 15.

The tool bar 17 is composed of an inverted U-shaped channel 30 with an upper laterally disposed portion 31 and depending front and rear wall portions 32, 33 respectively rigidly interconnected at their lower ends by a horizontal plate 34. The upper wall 31 has the shank receiving openings 18 and the lower wall 34 has shank receiving openings 42, rectangular in shape, and closely approximating the cross sectional size of the shanks 10.

Each upper opening 18 is composed of a front edge 35 adjacent the front edge 20 of the shank 10, a rear edge 36 adjacent the rear edge 21 of the shank 10 and opposite side edges 37, 38 on opposite sides of the shank 10. The fore and aft dimension of the openings 18 is considerably longer than the fore and aft dimension of the shanks 10. Consequently, unless otherwise restricted, the shanks 10 may be moved freely fore and aft in the upper openings 18.

A pair of lugs 40, 41 project inwardly from the respective edges 37, 38 and may reside in the vertical slots 22, 23. If the shank 10 is in its forward position, as shown in FIG. 2, the lugs 40, 41 are disposed in the notches 24 in the rear portion 15 of the shank. This, as is obvious, will prevent vertical displacement of the shank. If, however, the shank is in a rearward position, in which the rear edge 21 of the shank is closely adjacent the edge 36 of the opening, the lugs 40, 41 are positioned forwardly and out of the notches 24 and consequently the shank 10 may be moved vertically. In adjusting the vertical position of the earth ripping tool, it is necessary only that the shank be moved in this rear position and moved vertically to the desired vertical position and then moved forwardly so that the lugs 40, 41 are inserted in the corresponding notches 24 so as to retain the shank in the desired position. It will be noted that the shank opening 42 in the wall 34 is sufficiently larger than the shank itself to permit the upper end of the shank to be adjusted fore and aft in the slot or opening 18.

A retaining element 45 is normally positioned between the rear edge of the shank 10 and the rear edge 36 of the opening 18. The retainer 45 is detachably mounted on the shank 10 by detent means consisting of a pair of forwardly directed ears 46, 47 having inwardly extending beads 48, 49. The upper rear corner of the shank 10 is recessed on opposite sides as indicated at 50, 51 to receive the ears 46, 47. The recessed portions 50, 51 have bead receiving openings or slots, such as shown at 52 in FIG. 3, receiving the respective beads 48, 49. The retainer pin 45 also has a rearwardly projecting lug 53 overlying the rear portion of the top wall 31.

In mounting the retainer 45 on the shank, the lower vertical portion of the retainer 45 is driven between the edge 36 and the edge 21 of the opening and shank respectively and the ear portions 46, 47 and their respective beads 48, 49 are driven onto the recessed portions 50, 51. When driven downwardly the beads 48, 49 will rest in the slots 52 and consequently the retainer 45 will be held in position. For purposes of removing the retainer, a tool or prying device is positioned beneath the lug 53 and the top surface of the wall 31, and the retainer 53 is pried upwardly until the beads 48, 49 leave the openings or slots 52.

While only one form of the invention has been shown, it should be recognized that other forms and variations will occur to those skilled in the art. Therefore, it should be understood that while the preferred form of the invention has been shown and described in detail for purposes of fully disclosing the principles of the invention, it is not desired to limit or narrow the invention beyond the broad general concepts set forth in the appended claims.

We claim:

1. An earth ripping implement comprising a vertically disposed earth digging tool having a lower earth cutting end with an upwardly projecting shank, said shank having a front portion extending rearwardly from a front upright edge, a rear portion extending forwardly from a rear upright edge, and a vertical recessed portion between the front and rear portions, said recessed portion including a forward vertically disposed notch opening upwardly, and rearwardly extending notches projecting therefrom into the rear portion; a transverse tool supporting structure having a vertical opening therein for receiving the shank with a front edge forward of the shank and a rear edge rearward of the shank and opposite side edges on opposite sides of the shank, the fore and aft dimension of the opening being substantially greater than the fore and aft dimension of the shank, whereby the shank may be moved in the opening between forward and rearward positions; lug means extending inwardly from the side edges into the recessed portion of the shank and adapted to seat in the rearwardly extending notches upon the shank being in a forward position, to prevent vertical movement of the shank, and to reside in the forward vertical notch upon the shank being in its rearward position, to permit vertical movement of the shank; and a detachable element positionable between the rear edges of the shank and opening to retain the shank in its forward position.

2. An earth ripping implement comprising a vertically disposed earth digging tool having a lower earth cutting end with an upwardly projecting shank, said shank having a front portion extending rearwardly from a front upright edge, a rear portion extending forwardly from a rear upright edge, and a vertical recessed portion between the front and rear portions, said recessed portion including a forward vertically disposed notch opening upwardly, and rearwardly extending notches projecting therefrom into the rear portion; a transverse tool supporting structure having a vertical opening therein for receiving the shank with a front edge forward of the shank and a rear edge rearward of the shank and opposite side edges on opposite sides of the shank, the fore and aft dimension of the opening being substantially greater than the fore and aft dimension of the shank, whereby the shank may be moved in the opening between forward and rearward positions; lug means extending inwardly from the side edges into the recessed portion of the shank and adapted to seat in the rearwardly extending notches upon the shank being in a forward position, to prevent vertical movement of the shank, and to reside in the forward vertical notch upon the shank being in its rearward position, to permit vertical movement of the shank; a pair of bead retaining openings on opposite sides of the shank rear portion adjacent the top thereof; a retainer pin positionable between the rear edges of the shank and opening and having a pair of forwardly extending ear portions on opposite sides of the shank; a pair of beads on the respective ear portions projecting inwardly to reside in the respective bead retaining openings.

3. An earth ripping implement comprising a vertically disposed earth digging tool having a lower earth cutting end with an upwardly projecting shank having front and rear upright edges and comparatively narrow and wide upright portions, said narrow portion defining with the wide portion a vertical guide extending from the top part of the tool and including vertically spaced fore and aft extending notches projecting from the vertical guide; a transverse tool supporting structure having a vertical opening therein for receiving the shank with a front edge forward of the shank and a rear edge rearward of the shank and opposite side edges on opposite sides of the shank, the fore and aft dimension of the opening being substantially greater than the fore and aft dimension of the shank, whereby the shank may be moved in the opening between forward and rearward positions; lug means extending inwardly from the side edges into the narrow portion of the shank and adapted to seat in the notches upon the shank being in one of the aforesaid positions, to prevent vertical movement of the shank, and to reside in the vertical guide and out of the notches upon the shank being in the other of the aforesaid positions, to permit vertical movement of the shank; and a removable element insertable between the edges of the opening and shank to retain the shank in said one of the aforesaid positions.

4. An earth ripping implement comprising a vertically disposed earth digging tool having a lower earth cutting end with an upwardly projecting shank having comparatively narrow and wide upright portions defining at their juncture a vertical track between the front and rear edges of the shank and extending to the top part of the shank; vertically spaced notches projecting from the juncture into the wide portion; a transverse tool supporting structure having a vertical opening therein for receiving the shank, the opening being substantially greater in one dimension than a similar dimension of the shank, whereby the shank may be moved in the opening between two positions; lug means extending inwardly from the edge of the opening and adapted to seat in the notches upon the shank being in one of the aforesaid positions, to prevent vertical movement of the shank, and to reside in the narrow portion out of the notches upon the shank being in the other of the aforesaid positions, to permit vertical movement of the shank; and a removable element insertable between the edges of the opening and shank to retain the shank in said one of the aforesaid positions.

5. An earth ripping implement comprising a vertically disposed earth digging tool having a lower earth cutting end and an upwardly projecting shank, said shank having a front portion extending rearwardly from a front upright edge, a rear portion extending forwardly from a rear upright edge, and vertical upwardly opening recessed slots on opposite sides of the shank between the front and rear portions; recessed notches projecting into the rear portion from the vertical slots; a transverse tool supporting structure having a vertical opening therein for receiving the shank with a front edge forward of the shank and a rear edge rearward of the shank and opposite side edges on opposite sides of the shank, the fore and aft dimension of the opening being substantially greater than the fore and aft dimension of the shank, whereby the shank may be moved in the opening between forward and rearward positions; lug means extending inwardly from the side edges into the slots in the sides of the shank and adapted to seat in the notches upon the shank being in a forward position, to prevent vertical movement of the shank, and to reside in the vertical slots forward of the notches, upon the shank being in its rearward position, to permit vertical movement of the shank; and a detachable element positionable between the rear edges of the shank and opening to retain the shank in its forward position.

6. An earth ripping implement comprising a vertically disposed earth digging tool having a lower earth cutting end and an upwardly projecting shank, said shank having a front portion extending rearwardly from a front upright edge, a rear portion extending forwardly from a rear upright edge, and vertical upwardly opening recessed slots on opposite sides of the shank between the front and rear portions; recessed notches projecting from the slots into one of the portions; a transverse tool supporting structure having a vertical opening therein for receiving the shank with a front edge forward of the shank and a rear edge rearward of the shank and opposite side edges on opposite sides of the shank, the fore and aft dimension of the opening being substantially greater than the fore and aft dimension of the shank, whereby the shank may be moved in the opening between forward and rearward positions; lug means extending inwardly from the side edges into the slots in the sides of the shank and adapted to seat in the notches upon the shank being in one of the aforesaid positions, to prevent vertical movement of the shank, and to reside in the vertical slots out of the notches, upon the shank being in its other position, to permit vertical movement of the shank; and a detachable element positionable between the opening edge and the shank to retain the shank in its aforesaid one position.

7. An earth working implement comprising: a vertically disposed digging tool having a lower earth cutting end and an upwardly projecting shank having front and rear upright edges, a forward portion extending rearwardly from the forward edge, a rear portion extending forwardly from the rear edge, a vertical offset portion joining the forward and rear portions and extending from the top part of the shank, the offset portion having vertically spaced parts thereof projecting into one of the aforesaid portions and defining vertically spaced notches; a transverse tool supporting structure having a vertical opening therein for receiving the shank and to permit limited lateral movement of the shank in the opening between a first and second position, and having a fore-and-aft extending edge with a portion thereof complementing the offset portion of the shank, to permit the tool to be moved vertically upon its being in its first position, and adapted to seat in one of said notches, to prevent vertical movement of the tool upon its being in its second position, and means between the shank and supporting structure for retaining the shank in its second position.

8. An earth working implement comprising: a vertically disposed digging tool having a lower earth cutting end and an upwardly projecting shank having front and rear upright edges, upright portions between the forward and rear edges including a vertical laterally offset portion extending from the top part of the shank, the offset portion having vertically spaced parts thereof projecting into one of the remaining portions and defining vertically spaced notches; a transverse tool supporting structure having a vertical opening therein for receiving the shank and to permit limited lateral movement of the shank in the opening between a first and second position, and having a portion thereof complementing the offset portion of the shank, to permit the tool to be moved vertically upon its being in its first position, and adapted to seat in one of said notches to prevent vertical movement of the tool upon its being in its second position, and means between the shank and supporting structure for retaining the shank in its first position.

References Cited in the file of this patent
UNITED STATES PATENTS
696,898    Butler  ------------------ Apr. 1, 1902